United States Patent
Obaidi

(10) Patent No.: US 11,212,121 B2
(45) Date of Patent: Dec. 28, 2021

(54) ACOUSTIC DETECTOR FOR SOLID MEDIUM WITH WIRELESS TRANSMISSION

(71) Applicant: T-Mobile USA, Inc., Bellevue, WA (US)

(72) Inventor: Ahmad Arash Obaidi, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 408 days.

(21) Appl. No.: 16/219,668

(22) Filed: Dec. 13, 2018

(65) Prior Publication Data

US 2020/0195449 A1 Jun. 18, 2020

(51) Int. Cl.
| | | |
|---|---|---|
| *H04L 9/38* | (2006.01) | |
| *H04B 11/00* | (2006.01) | |
| *H04L 29/06* | (2006.01) | |
| *G10L 19/008* | (2013.01) | |

(52) U.S. Cl.
CPC .............. *H04L 9/38* (2013.01); *G10L 19/008* (2013.01); *H04B 11/00* (2013.01); *H04L 63/061* (2013.01)

(58) Field of Classification Search
CPC ......... G01N 29/36; G06F 3/043; G01S 15/04; A61K 49/00; H04L 29/06; H04L 9/38; H04L 63/061; H04L 7/00; H04L 9/08; H04L 9/14; H04W 4/00; H04W 88/02; H04W 88/08; G10L 19/008; H04B 11/00; H04B 1/707; G07C 9/00
See application file for complete search history.

(56) References Cited

U.S. PATENT DOCUMENTS

| | | | | |
|---|---|---|---|---|
| 8,050,875 B2* | 11/2011 | Karschnia | ................. | F16T 1/48 |
| | | | | 702/51 |
| 8,531,915 B2* | 9/2013 | Ammar | .................... | G01S 15/04 |
| | | | | 367/93 |
| 2008/0112885 A1* | 5/2008 | Okunev | ............... | A61B 5/0022 |
| | | | | 424/9.1 |
| 2009/0181662 A1* | 7/2009 | Fleischman | ........... | H04W 8/183 |
| | | | | 455/419 |
| 2011/0037734 A1* | 2/2011 | Pance | ..................... | G06F 3/043 |
| | | | | 345/177 |
| 2011/0103301 A1* | 5/2011 | Mueck | ................... | H04W 48/12 |
| | | | | 370/328 |

* cited by examiner

*Primary Examiner* — Thanhnga B Truong
(74) *Attorney, Agent, or Firm* — Han Santos, PLLC

(57) ABSTRACT

An example acoustic detector includes an acoustic transducer, an analog-to-digital converter, an encryption module, and a wireless communication interface. The acoustic transducer is to be coupled to a solid medium and is configured to generate an electrical signal in response to acoustic waves propagating through the solid medium. The analog-to-digital converter is coupled to the acoustic transducer to convert the electrical signal into digital acoustic data. The encryption module is coupled to encrypt the digital acoustic data to generate encrypted acoustic data and the wireless communication interface is coupled to transmit the encrypted acoustic data via one or more radio access technologies (RATs).

15 Claims, 7 Drawing Sheets

ACOUSTIC DETECTOR FOR SOLID MEDIUM WITH WIRELESS TRANSMISSION

BACKGROUND

A technological revolution in the home is driving development for new "smart" services, including consolidation by service providers in the fields of data, voice, video, security, energy management, etc., and is also driving the expansion of home networks. Buildings are getting smarter and more convenient as a means to reduce operational costs for enterprise facilities.

In the area of home and building automation, smart homes and buildings may provide control over virtually any device or system in the home or office, from appliances to plug-in electric vehicle (PEV) security systems. As such, in the near future, increasing development will lead to numerous 'smart' devices surrounding a user at home, in vehicles, at work, and in many other locations. These smart devices are increasingly popular for sensing environmental conditions, controlling equipment, and securely providing information, control, and alerts to users via applications of the network-connected devices that are connected to cloud-based services. Various approaches are used in these systems to allow for user interaction. For example, many smart devices provide the ability to detect a user's voice to accept voice commands and/or to enable voice communications (e.g., voice-calling).

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Aspects of the present disclosure are directed to computing platforms (i.e., acoustic detector, acoustic processing hub, etc.), computer-readable media, and processes for detecting acoustic waves that propagate through a solid medium.

Figure 1:
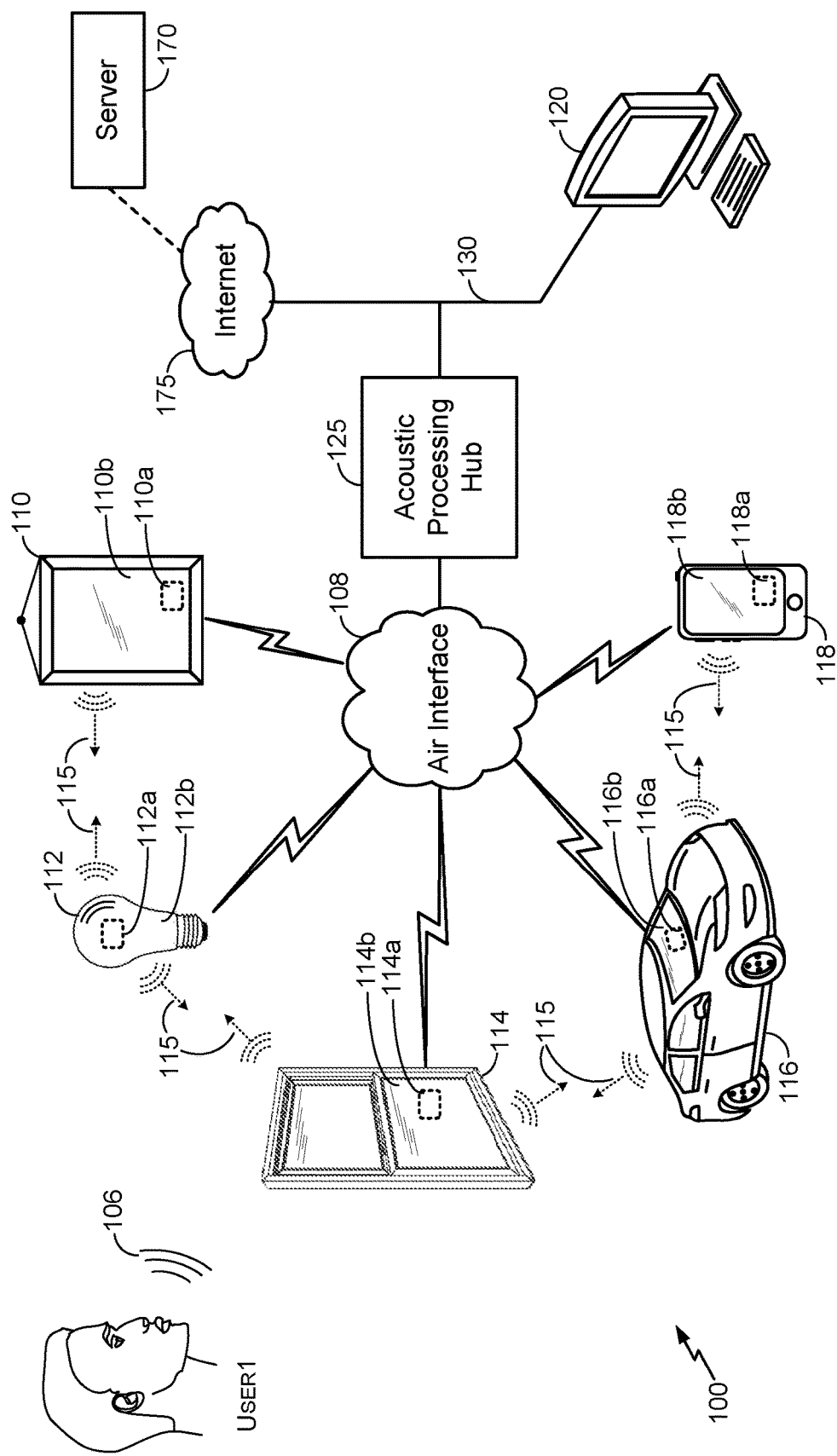
FIG. 1 illustrates an example architecture of a wireless communication network.

FIG. 1 illustrates an example architecture of a wireless communication network 100. As mentioned above, many smart devices such as those found in a user's home or vehicle include a dedicated microphone that requires the user to be in close proximity to the smart device in order for the smart device to detect and receive the user's voice. Accordingly, aspects of the present disclosure include utilizing one or more solid mediums that may already be included in a user's home, office, vehicle, etc., to detect acoustic waves, such as a user's voice that may propagate on or through the solid medium, itself.

For example, FIG. 1 illustrates acoustic detectors 110a, 112a, 114a, 116a, and 118a interfacing with various solid mediums. As shown in FIG. 1, the various solid mediums may include a glass sheet 110b of a picture/mirror 110, a glass bulb 112b of a light bulb 112, a glass pane 114b of a window 114, a window 116b of a vehicle 116, and a screen 118b of a user equipment (UE) 118.

As will be described below, the acoustic detectors 110a, 112a, 114a, 116a, and 118a may each include an acoustic transducer to detect an acoustic wave, such as user 1's voice 106. In some aspects, the acoustic transducers are configured to detect acoustic waves that propagate through their respective solid mediums (e.g., glass sheet 110b, glass bulb 112b, glass pane 114b, window 116b, screen 118b, etc.). In response to detecting the acoustic waves, the acoustic detectors 110a, 112a, 114a, 116a, and 118a may each digitize the acoustic waves into digital acoustic data, encrypt the digital acoustic data, and then wirelessly transmit the encrypted acoustic data via one or more radio access technologies (RATs) by way of air interface 108. Each of the acoustic detectors 110a, 112a, 114a, 116a, and 118a may forward the encrypted acoustic data via air interface 108 to another computing device, such as a home automation hub, a vehicle's audio/telephone system, a UE, and/or acoustic processing hub 125 without the need for the user 1 to be in close proximity to a particular microphone.

Accordingly, multiple windows, light bulbs, pictures, and/or mirrors in a home can be utilized to detect acoustic waves (e.g., voice 106) providing better coverage for audio capture. Similarly, multiple windows within a vehicle may be utilized to detect the acoustic waves without the need for a dedicated microphone within the vehicle itself.

Referring to FIG. 1, each of the acoustic detectors 110a, 112a, 114a, 116a, and 118a are configured to wirelessly communicate with another computing device (e.g., each other, acoustic processing hub 125, computing device 120, server 170, etc.) over a physical communications interface or layer, shown in FIG. 1 as air interface 108. The air interface 108 may comply with a RAT, such as a cellular communications protocol (e.g., Code-Division Multiple Access (CDMA), Evolution-Data Optimized (EVDO), evolved High Rate Packet Data (eHRPD), Global System for Mobile communications (GSM), Enhanced Data rates for GSM Evolution (EDGE), Widband CDMA (W-CDMA), Long-Term Evolution (LTE), etc.). The air interface 108 may also comply with a RAT such as a wireless IP protocol (e.g., Wi-Fi, IEEE 802.11). Even still, air interface 108 may comply with a short-range RAT, such as Bluetooth, Bluetooth Low Energy (BLE), Zigbee, etc.

FIG. 1 further illustrates the Internet 175 which may function to bridge packet-switched data communications between the various devices illustrated and server 170. Computing device 120 is shown as a desktop computer with a direct wired connection 130 to the Internet 175, such as a direct connection to a modem or router. In some examples, the server 170 can be implemented as a plurality of structurally separate servers, or alternately may correspond to a single server.

Also shown in FIG. 1, is an acoustic processing hub 125. As mentioned above, multiple windows of a vehicle (e.g., vehicle 116) and multiple solid mediums (e.g., 110b, 112b, 114b, 118b, etc.) of a home or office may include a corresponding acoustic detector (e.g., 110a, 112a, 114a, 116a, 118b, etc.). Accordingly, each of the acoustic detectors may be configured to wirelessly transmit encrypted acoustic data to the acoustic processing hub 125. In some examples, the acoustic processing hub 125 may receive multiple encrypted acoustic data and then resolve them into single acoustic data. For example, user 1's voice 116 may be detected by numerous acoustic detectors present in a room, where each acoustic detector generates and transmits encrypted acoustic data to acoustic processing hub 125 via air interface 108. In response to receiving the multiple encrypted acoustic data, the acoustic processing hub 125 may generate single acoustic data, such as a single audio stream. In some examples, the acoustic processing hub 125 combines the multiple received acoustic data into the single acoustic data, whereas in other examples, the acoustic processing hub 125 may designate one of the multiple received acoustic data as the single acoustic data. The acoustic processing hub 125 may then forward the single acoustic data to a computing device, such as UE 118, computing device 120, and/or server 170. Accordingly, as a user (e.g., user 1) moves around a home or office, or is within vehicle 116, various acoustic detectors may detect user 1's voice 106, where acoustic processing hub 125 combines and/or reduces the acoustic data into a single acoustic data.

Furthermore, at least some of the illustrated acoustic detectors 110a, 112a, 114a, 116a, and 118a may include an optional acoustic transmitter for generating non-audible acoustic waves 115. In these examples, an acoustic detector according to the present disclosure, may detect an acoustic wave such as User 1's voice 106 and convert the acoustic wave into a non-audible acoustic wave 115, such as an ultrasonic or infrasonic wave. The non-audible acoustic waves 115 may then be detected by one or more other acoustic detectors (e.g., acoustic detectors 110a, 112a, 114a, 116a, and 118a), thereby enabling peer-to-peer communication among the acoustic detectors. In some examples, peer-to-peer communication via non-audible acoustic waves 115 may extend the wireless range of one or more of the illustrated acoustic detectors. By way of example, the acoustic detector 112a may be unable to communicate via air interface 108 (e.g., due to a weak wireless signal, interference, etc.). Thus, acoustic detector 112a may convert the detected acoustic data (e.g., voice 106) into a non-audible acoustic wave 115 which is then detected and processed by acoustic detector 114a. The acoustic detector 114a may then wirelessly transmit the acoustic data to another computing device via air interface 108.

Figure 2:
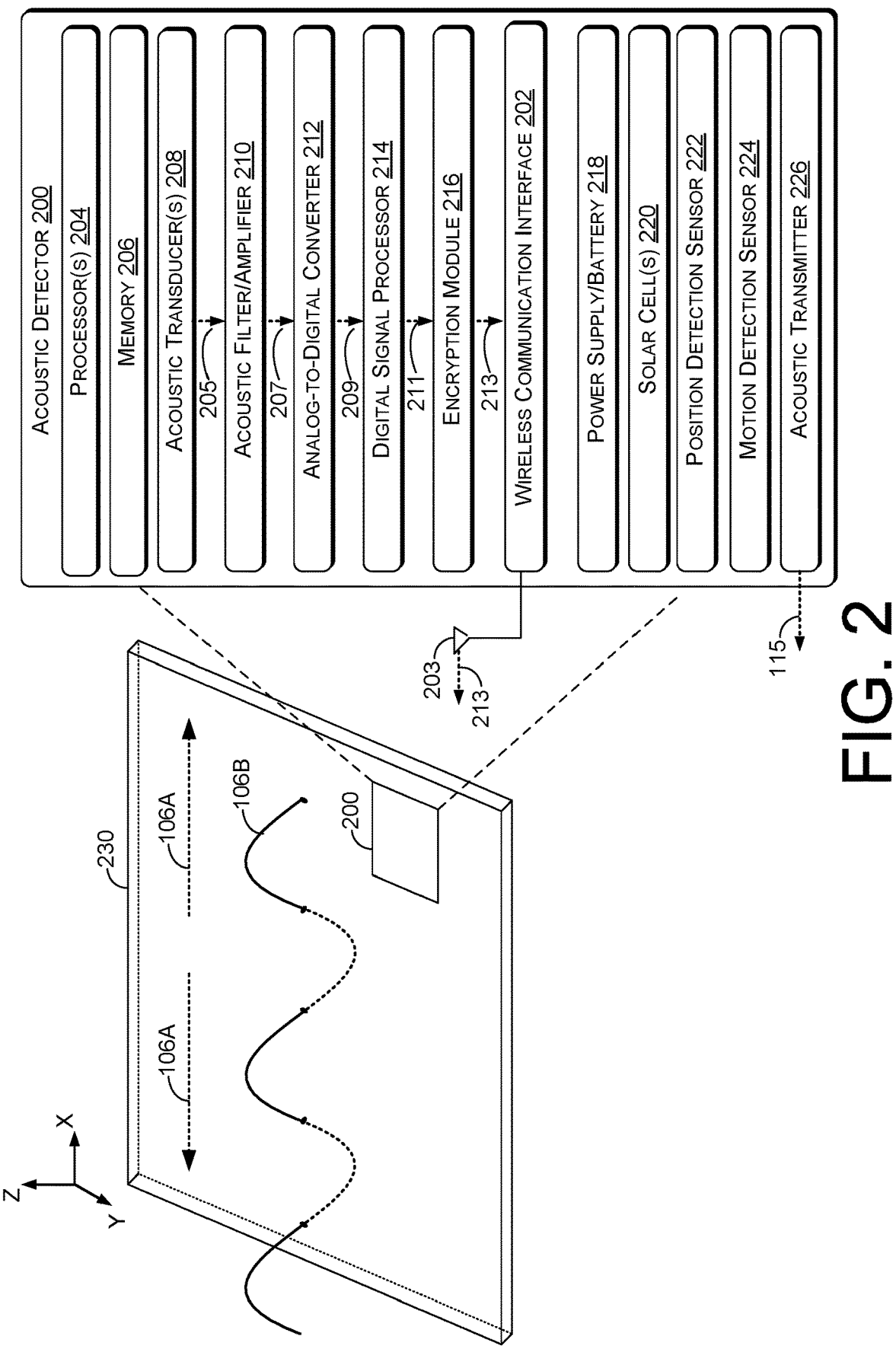
FIG. 2 illustrates example of an acoustic detector.

FIG. 2 illustrates an example acoustic detector 200. Acoustic detector 200 is one possible example of any of the acoustic detectors 110a, 112a, 114a, 116a, and 118a of FIG. 1. FIG. 2 also illustrates an example solid medium 230. Solid medium 230 is one possible example of any of the solid mediums of FIG. 1, including glass sheet 110b, glass bulb 112b, glass pane 114b, window 116b, and screen 118b.

In some examples, solid medium 230 is transparent or at least translucent to light. Accordingly, the solid medium 230 may be a material such as glass, plastic, polycarbonate, polyethylene, ceramic, or any other solid material that is at least translucent to light. Acoustic waves, such as voice 106, may travel through solid medium 230 as both a longitudinal wave 106A and as a transverse wave 106B, vibrating the molecules of solid medium 230 in both cases.

In some aspects, a transverse wave such as transverse wave 106B is a moving acoustic wave that includes oscillations occurring perpendicular (orthogonal) to the direction of energy transfer (or the propagation of the wave). For example, transverse wave 106B is illustrated in FIG. 2 as including oscillations that occur on the Z-axis, whereas the transverse wave 106B propagates through the solid medium 230 along the X-axis.

Longitudinal waves, such as longitudinal wave 106A are acoustic waves in which the displacement of the solid medium 230 is in the same direction as, or the opposite direction to, the direction of propagation of the wave. In some examples longitudinal waves may be referred to as compressional or compression waves because they produce compression and rarefaction when traveling through a solid medium. As shown in FIG. 2, longitudinal wave 106A is shown as propagating through solid medium 230 along the X-axis, which may cause compression and/or tension of the solid medium 230 along the same X-axis.

Accordingly, acoustic detector 200 includes at least one acoustic transducer 208 that is connected to, or incorporated within, the solid medium 230 itself to detect the longitudinal wave 106A, the transverse wave 106B, or both. In response to detecting an acoustic wave (e.g., voice 106, longitudinal wave 106A, transverse wave 106B, etc.), the acoustic transducer 208 may generate an electrical signal 205.

Figure 3A:
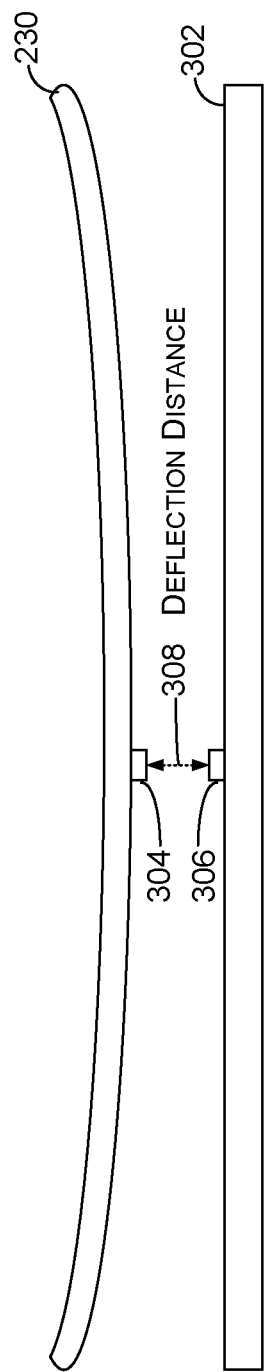
FIG. 3A illustrates an example acoustic transducer disposed on a solid medium for measuring a deflection distance of the solid medium.

By way of example, FIG. 3A illustrates an example of acoustic transducer 208 that includes a laser emitter 304 and a laser detector 306. As shown, the laser emitter 304 may be coupled to the solid medium 230 and is configured to generate a laser signal (e.g., laser beam). The laser detector 306 may be coupled to another surface 302 to detect the laser signal. In some examples, the other surface 302 is an additional pane of a window, a substrate of a screen, the backing of a mirror, etc. In any case, the laser emitter 304 and laser detector 306 are configured to generate an electrical signal (e.g., electrical signal 205 of FIG. 2) that is representative of a physical movement of the solid medium 230 due to acoustic waves that are propagating through the solid medium 230. For example, in the illustrated example of FIG. 3A, the laser emitter 304 and laser detector 306 are disposed on the solid medium 230 to detect a deflection distance 308 that may occur in the solid medium 230 due to a transverse wave (e.g., transverse wave 106B) propagating through the solid medium 230.

Although FIG. 3A illustrates a single laser detector 306 and a single laser emitter 304, in other examples, multiple laser detector and laser emitter pairs may be coupled to a single solid medium 230 to detect a respective deflection distance 308 at various areas of the solid medium 230.

In other examples, the acoustic transducer 208 of FIG. 2 may include an ultrasonic emitter to emit an ultrasonic signal and an ultrasonic detector to detect the ultrasonic signal, disposed on the solid medium 230 similar to the laser detector 306 and laser emitter 304 to also detect the deflection distance 308.

Figure 3B:
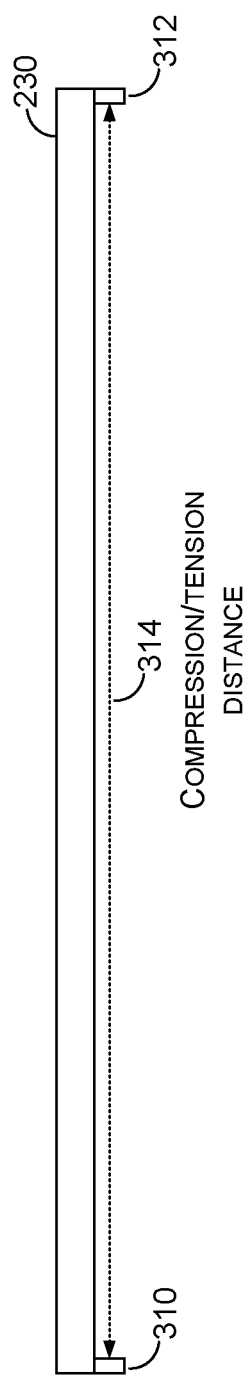
FIG. 3B illustrates an example acoustic transducer disposed on a solid medium for measuring a compression/tension distance of the solid medium.

By way of another example, FIG. 3B illustrates an example of acoustic transducer 208 as including a laser emitter 310 and a laser detector 312. As shown, the laser emitter 310 may be coupled to the solid medium 230 at a first location and may be configured to generate a laser signal (e.g., laser beam). The laser detector 312 may be coupled to another area of the solid medium 230 to detect the laser signal. In some examples, the laser emitter 310 and laser detector 312 are disposed on a periphery of the solid medium 230. In any case, the laser emitter 310 and laser detector 312 are configured to generate an electrical signal (e.g., electrical signal 205 of FIG. 2) that is representative of a physical movement of the solid medium 230 due to acoustic waves that are propagating through the solid medium 230. For example, in the illustrated example of FIG. 3B, the laser emitter 310 and laser detector 312 are disposed on the solid medium 230 to detect a compression/tension distance 314 that may occur in the solid medium 230 due to a longitudinal wave (e.g., longitudinal wave 106A) propagating through the solid medium 230.

Although FIG. 3B illustrates a single laser detector 312 and a single laser emitter 310, in other examples, multiple laser detector and laser emitter pairs may be coupled to single solid medium 230 to detect a respective compression/tension distance 314 at various areas of the solid medium 230.

In other examples, the acoustic transducer 208 of FIG. 2 may include an ultrasonic emitter to emit an ultrasonic signal and an ultrasonic detector to detect the ultrasonic signal, disposed on the solid medium 230 similar to the laser detector 312 and laser emitter 310 to detect the compression/tension distance 314.

Returning now to FIG. 2, acoustic detector 200 is shown as also including at least one processor 204, at least one memory 206, the acoustic transducer 208, an acoustic filter/amplifier 210, an analog-to-digital converter 212, a digital signal processor (DSP) 214, an encryption module 216, a wireless communication interface 202, a power supply/battery 218, one or more solar cells 220, a position detection sensor 222, a motion detection sensor 224, and an acoustic transmitter 226. Also shown in FIG. 2 are an antenna 203, an electrical signal 205, a filtered signal 207, digital acoustic data 209, processed acoustic data 211, encrypted acoustic data 213, and a non-audible acoustic wave 115.

The components of acoustic detector 200, illustrated in FIG. 2, may be implemented in different types of apparatuses in different implementations (e.g., in an Application Specific Integrated Circuit (ASIC), in a System on a Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The acoustic detector 200 may include the wireless communication interface 202 and corresponding antenna 203 for communicating with other nodes. For example, the wireless communication interface 202 may comprise a network interface that is configured to communicate with one or more network entities via a wire-based or wireless links. In some aspects, the wireless communication interface 202 may be implemented as a transceiver configured to support wire-based or wireless signal communication. This communication may involve, for example, sending and receiving: messages, parameters, encrypted acoustic data 213, or other types of information.

In some examples, the wireless communication interface 202 is configured to communicate with one or more other computing devices via an air interface 108 via one or more radio access technologies (RATs). In some aspects, the RAT includes a cellular communications protocol, such as CDMA, EVDO, eHRPD, GSM, EDGE, W-CDMA, LTE, etc. The one or more RATs may also include a wireless IP protocol (e.g., Wi-Fi, IEEE 802.11) and/or a short-range RAT, such as Bluetooth, Bluetooth Low Energy (BLE), Zigbee, etc.

In implementations where wireless communication interface 202 is configured to communicate via a cellular communication protocol, acoustic detector 200 may be assigned a unique identifier, such as an Integrated Circuit Card Identifier (ICCID), an International Mobile Equipment Identity (IMEI), an International Mobile Subscriber Identity (IMSI), and the like.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not consist of, and are not formed exclusively by, modulated data signals, such as a carrier wave.

The processor 204 of acoustic detector 200 may execute instructions and perform tasks under the direction of software components that are stored in memory 206. For example, the memory 206 may store various software components that are executable or accessible by the one or more processors 204 of the acoustic detector 200.

Software included in memory 206 may include routines, program instructions, objects, and/or data structures that perform particular tasks or implement particular abstract data types. For example, as will be described in further detail below, the encryption module 216 may include one or more instructions, which when executed by the one or more processors 204 direct the acoustic detector 200 to perform operations related to encrypting acoustic data 211 to generate encrypted acoustic data 213.

In operation, the acoustic transducer 208 is configured to generate an electrical signal 205 in response to an acoustic wave (e.g., voice 106, longitudinal wave 106A, transverse wave 106B, etc.) that is propagating through the solid medium 230. The acoustic filter/amplifier 210 is coupled to receive the electrical signal 205 and to generate a filtered signal 207. In some examples, acoustic filter/amplifier 210 is configured to limit the electrical signal 205 to an audible frequency range (e.g., 20 Hz to 20 kHz). The acoustic filter/amplifier 210 may include other circuitry and/or hardware for pre-conditioning the electrical signal 205 for subsequent digitization.

The Analog-to-Digital converter (ADC) 212 is coupled to receive the filtered signal 207 and to convert the filtered signal 207 into a digital acoustic data 209. The ADC 212 may be implemented utilizing one or more of a variety of conversion circuits including, but not limited to, a flash ADC, a successive-approximation ADC, an integrating ADC, a ramp ADC, a pipelined ADC, and a sigma-delta ADC.

The DSP 214 is coupled to receive the digital acoustic data 209 and to generate processed acoustic data 211 in response thereto. The DSP 214 is configured to perform one or more of a variety of digital signal processing operations, such as audio processing, speech processing, filtering, noise removal, etc.

The processed acoustic data 211 is then received by the encryption module 216, which is configured to encrypt the acoustic data (e.g., processed acoustic data 211) to generate the encrypted acoustic data 213. The encryption module 216 may encrypt the acoustic data via at least one of a variety of digital encryption algorithms.

Also shown in FIG. 2 is a power supply/battery 218 for providing power to operate the acoustic detector 200. FIG. 2 also shows one or more optional solar cells 220. In some examples, solar cells 220 are disposed on the solid medium 230 to generate power to operate the acoustic detector 200 and/or to provide power to the power supply/battery 218 in response to light that is incident on the solid medium 230.

In some examples, the acoustic detector 200 is configured to enter a low power mode to conserve power consumed by the acoustic detector 200, when not in use. Accordingly, the acoustic detector 200 may include a motion detection sensor 224. In some examples, motion detection sensor 224 is incorporated into the acoustic detector 200 and/or within the solid medium 230, itself, to detect movement of a user (e.g., user1) within a proximity of the solid medium 230. In some aspects, the motion detection sensor 224 includes a proximity detector or other circuitry for emitting an electromagnetic field or a beam of electromagnetic radiation (e.g., ultrasonic, infrared, etc.) in or around the solid medium 230, and then to detect changes in the field or return signal. If the motion detection sensor 224 detects an absence of movement by a user (e.g., user1) then the motion detection sensor 224 may trigger the acoustic detector 200 to enter the low power mode. When in the low power mode, the acoustic detector 200 may limit the operations of one or more components of the acoustic detector 200. For example, the acoustic detector 200 may disable the wireless communication interface 202 such that no transmissions occur. The motion detection sensor 224 may also trigger the acoustic detector 200 to enter a normal power operating mode in response to detecting movement of the user to resume normal operations.

As mentioned above, the acoustic detector 200 may be coupled to, or incorporated within, a variety of solid mediums including a glass pane 114b of a window 114 or a window 116b of a vehicle 116. Thus, in some examples, the solid medium 230 may be moveable between numerous positions (e.g., vehicle or building windows may be in an open position or a closed position). The solid medium 230 may have differing acoustic properties depending on the position of the solid medium 230. Accordingly, in some aspects, the acoustic detector 200 may include a position detection sensor 222 to detect movement and/or a position of the solid medium 230. In some aspects, the position detection sensor 222 is configured to trigger the acoustic detector 200 to disable or otherwise prevent the wireless communication interface 202 from transmitting in response to detecting that the solid medium 230 is in a first position (e.g., open window). The position detection sensor 222 may also be configured to trigger the acoustic detector 200 to enable or otherwise allow the wireless communication interface 202 to transmit the encrypted acoustic data in response to detecting that the solid medium 230 is in a second position (e.g., closed window). In some examples, the position detection sensor 222 may include a mechanical switch coupled to the solid medium 230.

Further illustrated in FIG. 2 is an optional acoustic transmitter 226 for generating non-audible acoustic waves 115. In this example, acoustic transmitter 226 may convert the encrypted acoustic data 213 into a non-audible acoustic wave 115, such as an ultrasonic or infrasonic wave. The non-audible acoustic wave 115 may then be detected by one or more other acoustic detectors (e.g., acoustic detectors 110a, 112a, 114a, 116a, and 118a), thereby enabling peer-to-peer communication among the acoustic detectors. In some examples, the acoustic transmitter 226 includes an ultrasonic transmitter for broadcasting non-audible acoustic wave 115 in a frequency range that is higher than human hearing (e.g., greater than 20 kHz). In another example, the acoustic transmitter 226 includes an infrasonic transmitter for broadcasting non-audible acoustic wave 115 in a frequency range that is lower than human hearing (e.g., lower than 20 Hz).

As mentioned above, peer-to-peer communication via non-audible acoustic waves 115 may extend the wireless range of one or more of the illustrated acoustic detectors. Thus, acoustic transducer 208 may be configured to detect not only audible acoustic waves (e.g., voice 106), but also non-audible acoustic waves 115 that propagate through solid medium 230.

As described above, FIG. 2 is a simplified block diagram illustrating several sample aspects of components that may be employed in an acoustic detector 200 configured to perform the detection of acoustic waves, as taught herein. In addition, the components and functions represented in FIG. 2, as well as other components and functions described herein, may be implemented using any suitable means. Such means also may be implemented, at least in part, using corresponding structure as taught herein. For example, the components described above in conjunction with the components of FIG. 2 also may correspond to similarly designated "means for" functionality. Thus, in some aspects one or more of such means may be implemented using one or more of processor components, integrated circuits, or other suitable structure as taught herein.

For example, a first means for generating an electrical signal in response to acoustic waves propagating through a solid medium may correspond at least in some aspects to, for example, acoustic transducer 208 of FIG. 2, including the laser/ultrasonic detectors of FIGS. 3A and 3B. A second means for converting the electrical signal into digital acoustic data may correspond at least in some aspects to, for example, analog-to-digital converter 212 and/or processor 204 of FIG. 2. A third means for encrypting the digital acoustic data to generate encrypted acoustic data may correspond at least in some aspects to, for example, the encryption module 216, the processor 204, and/or the memory 206 of FIG. 2. A fourth means for wirelessly transmitting the encrypted acoustic data via one or more RATs may correspond at least in some aspects to, for example, the wireless communication interface 202 and/or antenna 203 of FIG. 2.

The functionality of the above-described "mean for" components may be implemented in various ways consistent with the teachings herein. In some designs, the functionality of these "means for" components may be implemented as one or more electrical components. In some designs, the functionality of these components may be implemented as a processing system including one or more processor components. In some designs, the functionality of these components may be implemented using, for example, at least a portion of one or more integrated circuits (e.g., an ASIC). As used herein, an integrated circuit may include a processor, software, other related components, or some combination thereof. Thus, the functionality of different components may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one component.

Figure 4:
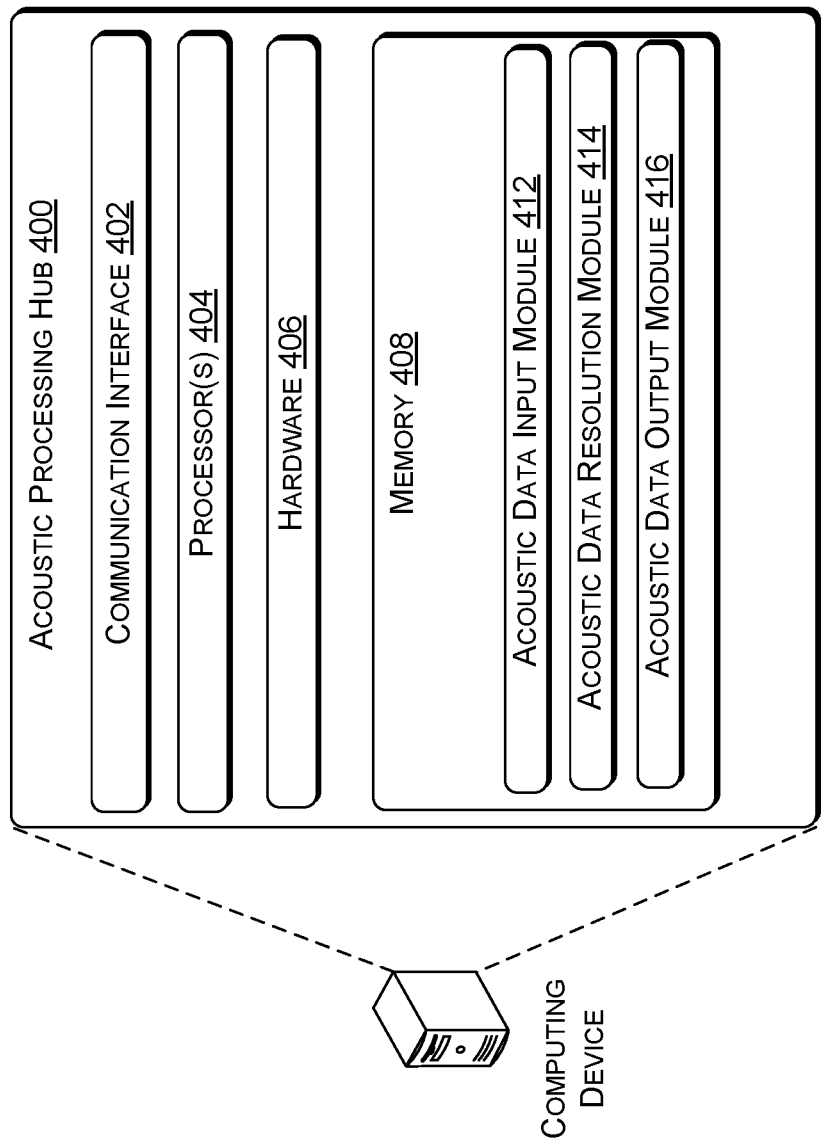
FIG. 4 illustrates an example acoustic processing hub.

FIG. 4 illustrates an example acoustic processing hub 400. Acoustic processing hub 400 of FIG. 4 is one possible example implementation of acoustic processing hub 125 of FIG. 1. The acoustic processing hub 400 may include at least one communication interface 402 for communicating with other nodes. For example, the communication interface 402 may comprise a network interface that is configured to communicate with one or more network entities via wire-based or wireless links. This communication may involve, for example, sending and receiving: messages, parameters, encrypted acoustic data 213 or other types of information.

The acoustic processing hub 400 may also include other components that may be used in conjunction with the operations as taught herein. For example, the acoustic processing hub 400 may include one or more processors 404, hardware 406, and memory 408.

The hardware 406 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processor 404 may execute instructions and perform tasks under the direction of software components that are stored in memory 408. For example, the memory 408 may store various software components that are executable or accessible by the one or more processors 404. The various components may include an acoustic data input module 412, an acoustic data resolution module 414, and an acoustic data output module 416.

The acoustic data input module 412, acoustic data resolution module 414, and the acoustic data output module 416 may include routines, program instructions, objects, and/or data structures that perform particular tasks or implement particular abstract data types. For example, the acoustic data input module 412 may include one or more instructions, which when executed by the one or more processors 404 direct the acoustic processing hub 400 to perform operations related to: receiving encrypted acoustic data 213 from multiple acoustic detectors (e.g., acoustic detector 200 of FIG. 2) via air interface 108. The acoustic data resolution module 414 may be configured to resolve the multiple acoustic data into single acoustic data, while the acoustic data output module 416 is configured to forward the single acoustic data to a computing device.

Figure 5:
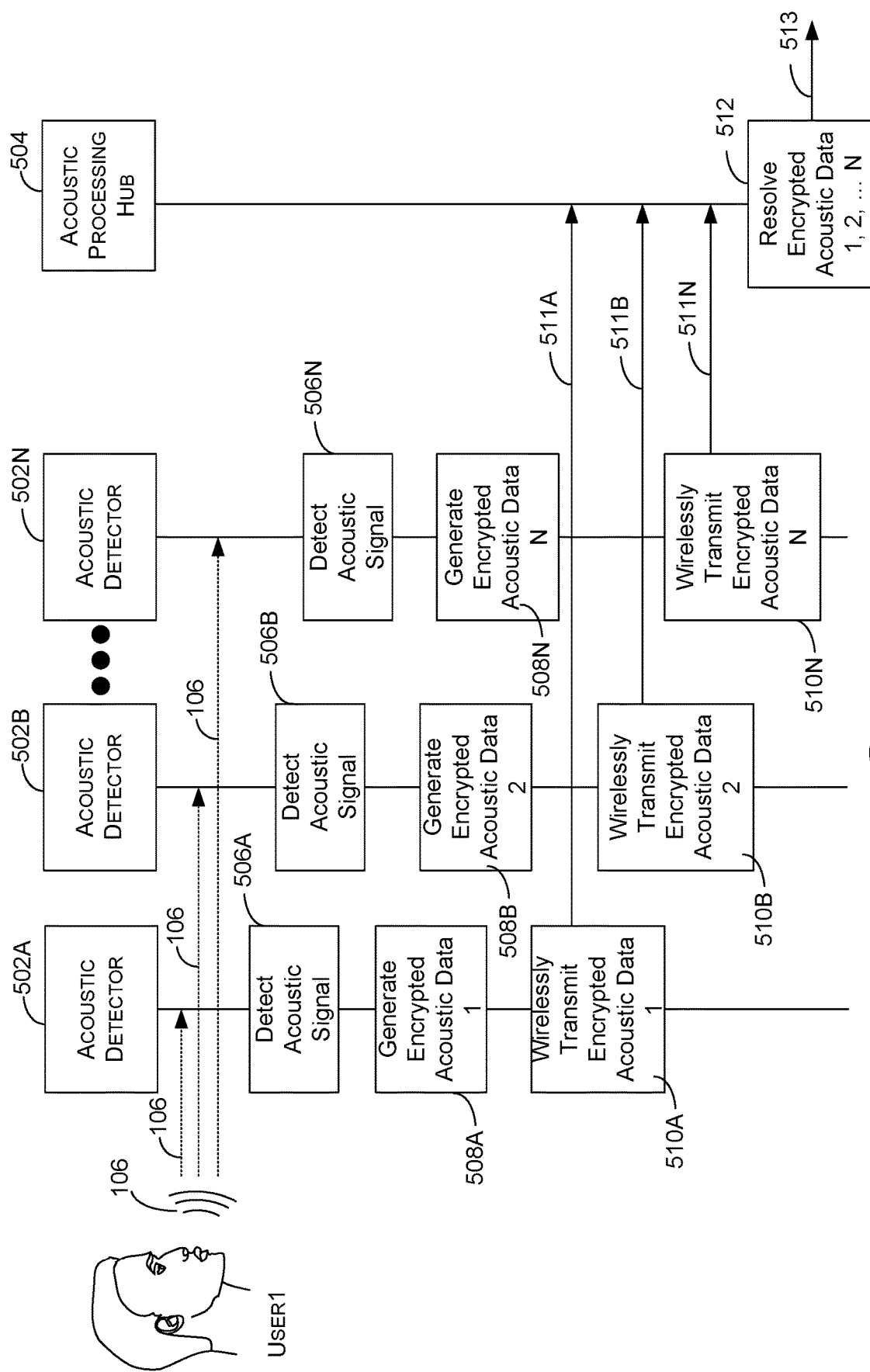
FIG. 5 is a call flow diagram of an example process for wirelessly receiving and resolving multiple encrypted acoustic data.

The operation of acoustic processing hub 400 will be described with reference to FIG. 5. FIG. 5 illustrates a user 1, multiple acoustic detectors 502A-502N, and an acoustic processing hub 504. Acoustic detectors 502A-502N may correspond to any of the acoustic detectors described herein, including acoustic detectors 110a, 112a, 114a, 116a, and 118a of FIG. 1, and/or acoustic detector 200 of FIG. 2. Acoustic processing hub 504 may correspond to any of the acoustic processing hubs described here, including acoustic processing hub 125 of FIG. 1 and/or acoustic processing hub 400 of FIG. 4.

As shown in FIG. 5, user1 may generate an acoustic signal (e.g., voice 106). In blocks 506A-506N, the voice 106 is then detected by the respective acoustic transducers 208 of each of the respective acoustic detectors 502A-502N. Blocks 508A-508N illustrate each acoustic detector 502A-502N generating encrypted acoustic data 511A-511N, which are then wirelessly transmitted in blocks 510A-510N to the acoustic data input module 412 of the acoustic processing hub 504. In block 512, the acoustic data resolution module 414 resolves the encrypted acoustic data 511A-511N into single acoustic data 513. As will be described below, resolving the encrypted acoustic data 511A-511N may include combining two or more of the encrypted acoustic data 511A-511N into the single acoustic data 513. In other examples, resolving the encrypted acoustic data 511A-511N may include designating one of the encrypted acoustic data 511A-511N as the single acoustic data 513. In some examples, the single acoustic data 513 represents a stream of audio data. In other examples, the single acoustic data 513 represents a voice command spoken by user1. In yet another example, the single acoustic data 513 represents an audio file representative of the voice 106 (e.g., audio recording of the voice 106).

Figure 6:
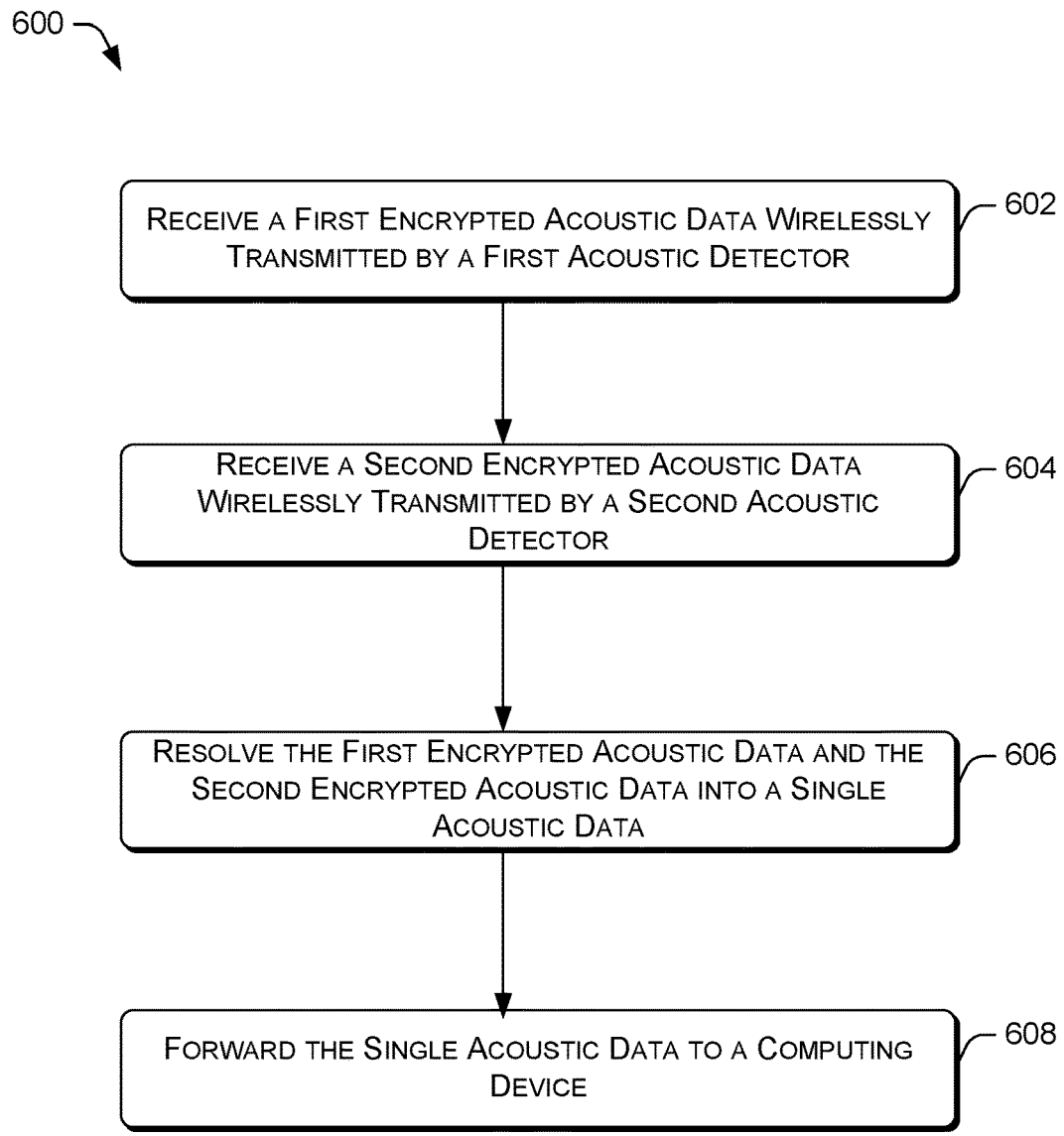
FIG. 6 is a flow diagram illustrating an example process performed by an acoustic processing hub.

FIG. 6 is a flow diagram illustrating an example process 600 performed by an acoustic processing hub, such as acoustic processing hub 400 of FIG. 4. In a process block 602, acoustic data input module 412 receives a first encrypted acoustic data (e.g., encrypted acoustic data 511A of FIG. 5) that was wirelessly transmitted by a first acoustic detector. In a process block 604, the acoustic data input module 412 receives a second encrypted acoustic data (e.g., encrypted acoustic data 511B of FIG. 5) that was wirelessly transmitted by a second acoustic detector. In a process block 606, the acoustic data resolution module 414 resolves the first encrypted acoustic data and the second encrypted acoustic data into single acoustic data (e.g., single acoustic data 513 of FIG. 5).

In some examples, resolving the first encrypted acoustic data and the second encrypted acoustic data includes combining the first encrypted acoustic data and the second encrypted acoustic data. Thus, in some aspects, each acoustic detector 200 may incorporate a corresponding timestamp in their respective acoustic data. That is, first acoustic data generated by the first acoustic detector may include a first timestamp and the second acoustic data generated by the second acoustic detector may include a second timestamp. Accordingly, the acoustic data resolution module 414 may combine the first encrypted acoustic data with the second encrypted acoustic data based, in part, on their respective first and second time stamps.

In another aspect, the acoustic data resolution module 414 may generate the single acoustic data 513 by designating one of the first encrypted acoustic data or the second encrypted acoustic data as the single acoustic data 513. For example, the acoustic data resolution module 414 may compare the first timestamp with the second timestamp and select one of the first or second encrypted acoustic data based on the comparison. That is, in some examples, an earlier timestamp may indicate that the acoustic detector is closer to the originator (e.g., user1) of the acoustic wave (e.g., voice 106). Thus, if the first timestamp of the first encrypted acoustic data is earlier than the second timestamp of the second encrypted acoustic data then the acoustic data resolution module 414 may designate the first encrypted acoustic data as the single acoustic data 513.

In another example, the acoustic data resolution module 414 may designate one of the received encrypted acoustic data based on a relative volume of the acoustic signal. For example, if a volume of the first encrypted acoustic data is louder than a volume of the second encrypted acoustic data, the acoustic data resolution module 414 may designate the first encrypted acoustic data as the single acoustic data 513.

Next, in process block 608, the acoustic data output module 416 forwards the single acoustic data 513 to a computing device. For example, the acoustic data output module 416 may wirelessly transmit the single acoustic data 513 via air interface 108 or via internet 175 to another computing device, such as UE 118, computing device 120, and/or server 170. In another example, the acoustic data output module 416 may transmit the single acoustic data 513 to a home automation hub or to a vehicle's audio/telephone system.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An acoustic detector, comprising:
    an acoustic transducer to be coupled to a solid medium, wherein the acoustic transducer is configured to generate an electrical signal that is representative of a movement of the solid medium due to acoustic waves propagating through the solid medium, the acoustic transducer comprising:
        an emitter comprising at least one of a laser emitter to emit a laser signal or an ultrasonic emitter to emit an ultrasonic signal, the emitter coupled to the solid medium; and
        a detector comprising at least one of a laser detector to detect the laser signal or an ultrasonic detector to detect the ultrasonic signal, the detector being configured to generate the electrical signal;
    an analog-to-digital converter coupled to the acoustic transducer to convert the electrical signal into digital acoustic data;
    an encryption module coupled to encrypt the digital acoustic data to generate encrypted acoustic data; and
    a wireless communication interface coupled to transmit the encrypted acoustic data via one or more radio access technologies (RATs).

2. The acoustic detector of claim 1, wherein the movement of the solid medium comprises a deflection of the solid medium due to a transverse acoustic wave propagating through the solid medium.

3. The acoustic detector of claim 1, wherein the movement of the solid medium comprises a compression of the solid medium due to a longitudinal acoustic wave propagating through the solid medium.

4. The acoustic detector of claim 1, further comprising an acoustic filter coupled to the acoustic transducer to limit the electrical signal to an audible frequency range.

5. The acoustic detector of claim 1, wherein the solid medium is translucent to light.

6. The acoustic detector of claim 5, wherein the solid medium comprises at least one material selected from the group consisting of: glass, plastic, acrylic, polycarbonate, polyethylene, and ceramic.

7. The acoustic detector of claim 1, further comprising:
    a motion detection sensor to be coupled to detect movement of a user within a proximity of the solid medium, wherein the acoustic detector is configured to enter a low power mode in response to the motion detection sensor detecting an absence of movement of the user, and to enter a normal power operating mode in response to the motion detection sensor detecting movement of the user.

8. The acoustic detector of claim 1, further comprising:
    a position detection sensor to be coupled to the solid medium to detect movement of the solid medium, wherein the acoustic detector is configured to disable the wireless communication interface and to prevent the transmission of the encrypted acoustic data in response to the position detection sensor determining that the solid medium is in a first position, and wherein the acoustic detector is further configured to enable the wireless communication interface and to enable the transmission of the encrypted acoustic data in response to the position detection sensor determining that the solid medium is in a second position.

9. The acoustic detector of claim 1, further comprising:
    at least one solar cell to be coupled to the solid medium and configured to generate power to operate the acoustic detector in response to light incident on the solid medium.

10. The acoustic detector of claim 1, wherein the one or more RATs comprises a cellular communication protocol, and wherein the acoustic detector further comprises a unique identifier selected from the group consisting of: an Integrated Circuit Card Identifier (ICCID), an International Mobile Equipment Identity (IMEI), and an International Mobile Subscriber Identity (IMSI).

11. The acoustic detector of claim 1, wherein the one or more RATs comprises at least one RAT selected from the group consisting of Bluetooth, Bluetooth Low Energy (BLE), Wi-Fi, or Zigbee.

12. The acoustic detector of claim 1, further comprising:
    an acoustic transmitter coupled to convert the encrypted acoustic data into a non-audible acoustic signal and to broadcast the non-audible acoustic signal.

13. The acoustic detector of claim 12, wherein the acoustic transmitter comprises an ultrasonic transmitter or an infrasonic transmitter.

14. The acoustic detector of claim 1, wherein the acoustic transducer is further configured to generate the electrical signal in response to non-audible acoustic waves generated by one or more other acoustic detection sensors.

15. An acoustic detector, comprising:
    means for generating an electrical signal in response to acoustic waves propagating through a solid medium, such means for generating the electrical signal comprising:

an emitter means comprising at least one of a laser emitter to emit a laser signal or an ultrasonic emitter to emit an ultrasonic signal, the emitter coupled to the solid medium; and a detector means comprising at least one of a laser detector to detect the laser signal or an ultrasonic detector to detect the ultrasonic signal, the detector being configured to generate the electrical signal;

means for converting the electrical signal into digital acoustic data;

means for encrypting the digital acoustic data to generate encrypted acoustic data; and means for wirelessly transmitting the encrypted acoustic data via one or more radio access technologies (RATs).

* * * * *